United States Patent
Grochowski et al.

(10) Patent No.: US 9,785,436 B2
(45) Date of Patent: Oct. 10, 2017

(54) APPARATUS AND METHOD FOR EFFICIENT GATHER AND SCATTER OPERATIONS

(71) Applicant: Intel Corporation, Santa Clara, CA (US)

(72) Inventors: Edward T. Grochowski, San Jose, CA (US); Dennis R. Bradford, Portland, CA (US); George Z. Chrysos, Portland, OR (US); Andrew T. Forsyth, Kirkland, WA (US); Michael D. Upton, Seattle, WA (US); Lisa K. Wu, New York, NY (US)

(73) Assignee: INTEL CORPORATION, Santa Clara, CA (US)

( * ) Notice: Subject to any disclaimer, the term of this patent is extended or adjusted under 35 U.S.C. 154(b) by 950 days.

(21) Appl. No.: 13/631,071

(22) Filed: Sep. 28, 2012

(65) Prior Publication Data

US 2014/0095831 A1    Apr. 3, 2014

(51) Int. Cl.
| G06F 9/30 | (2006.01) |
| G06F 9/34 | (2006.01) |
| G06F 9/35 | (2006.01) |
| G06F 9/345 | (2006.01) |
| G06F 9/355 | (2006.01) |

(52) U.S. Cl.
CPC ...... *G06F 9/30036* (2013.01); *G06F 9/30018* (2013.01); *G06F 9/30043* (2013.01); *G06F 9/30145* (2013.01); *G06F 9/345* (2013.01); *G06F 9/355* (2013.01)

(58) Field of Classification Search
CPC ...... G06F 9/345; G06F 9/355; G06F 9/30018; G06F 9/30036; G06F 9/30043; G06F 9/30145
See application file for complete search history.

(56) References Cited

U.S. PATENT DOCUMENTS

| 4,888,679 | A | * | 12/1989 | Fossum et al. | 712/6 |
| 5,537,606 | A | * | 7/1996 | Byrne | G06F 9/30109 711/169 |
| 6,202,130 | B1 | * | 3/2001 | Scales et al. | 711/137 |
| 6,253,306 | B1 | * | 6/2001 | Ben-Meir et al. | 712/207 |

(Continued)

OTHER PUBLICATIONS

Intel, "Intel Xeon Phi Coprocessor Instruction Set Architecture Reference Manual", Sep. 7, 2012, pp. 1-14, 297-309, [retrieved on Dec. 28, 2015]. Retrieved from the Internet <URL: https:// software. intel. com /sites/default/files/forum/278102/327364001en. pdf>.*

*Primary Examiner* — Benjamin Geib
(74) *Attorney, Agent, or Firm* — Nicholson De Vos Webster & Elliott LLP

(57) ABSTRACT

An apparatus and method are described for performing efficient gather operations in a pipelined processor. For example, a processor according to one embodiment of the invention comprises: gather setup logic to execute one or more gather setup operations in anticipation of one or more gather operations, the gather setup operations to determine one or more addresses of vector data elements to be gathered by the gather operations; and gather logic to execute the one or more gather operations to gather the vector data elements using the one or more addresses determined by the gather setup operations.

26 Claims, 18 Drawing Sheets

(56) References Cited

U.S. PATENT DOCUMENTS

| | | | |
|---|---|---|---|
| 7,093,102 B1* | 8/2006 | Dulong | G06F 9/30036 |
| | | | 711/217 |
| 7,627,735 B2* | 12/2009 | Espasa et al. | 712/7 |
| 2011/0153983 A1* | 6/2011 | Hughes et al. | 712/22 |
| 2012/0060016 A1* | 3/2012 | Eichenberger et al. | 712/4 |
| 2012/0144089 A1* | 6/2012 | Hall et al. | 711/3 |

* cited by examiner

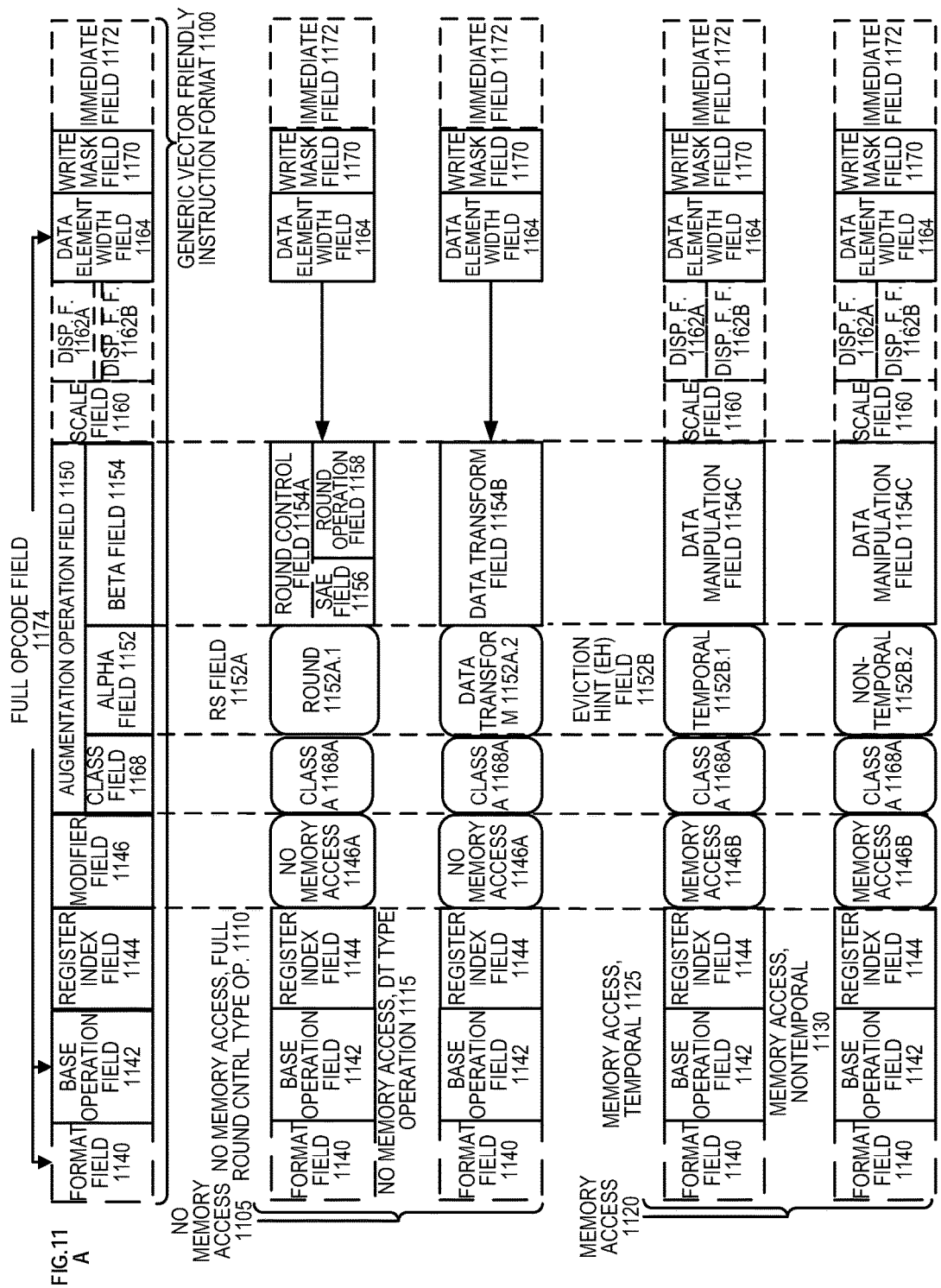

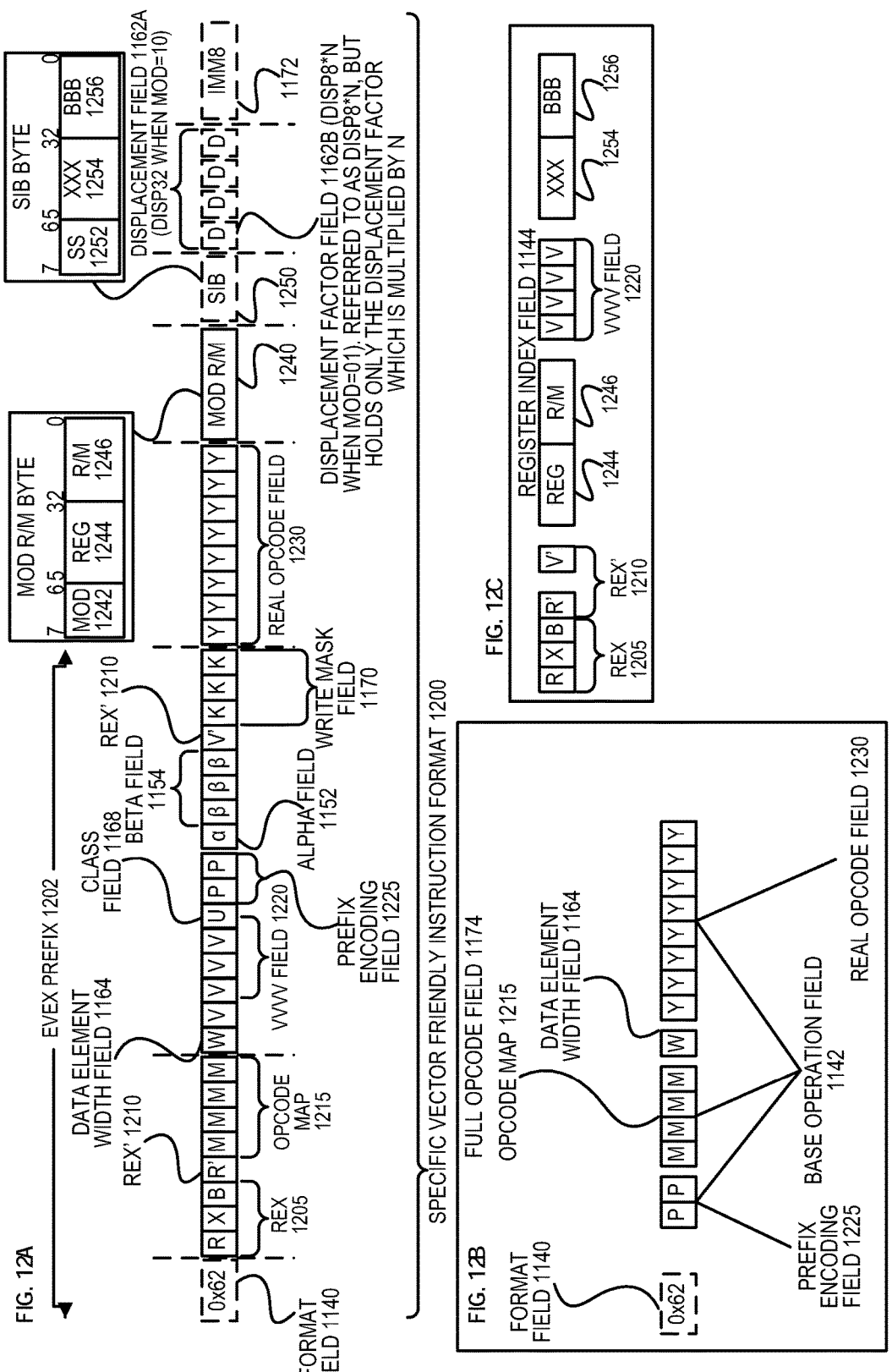

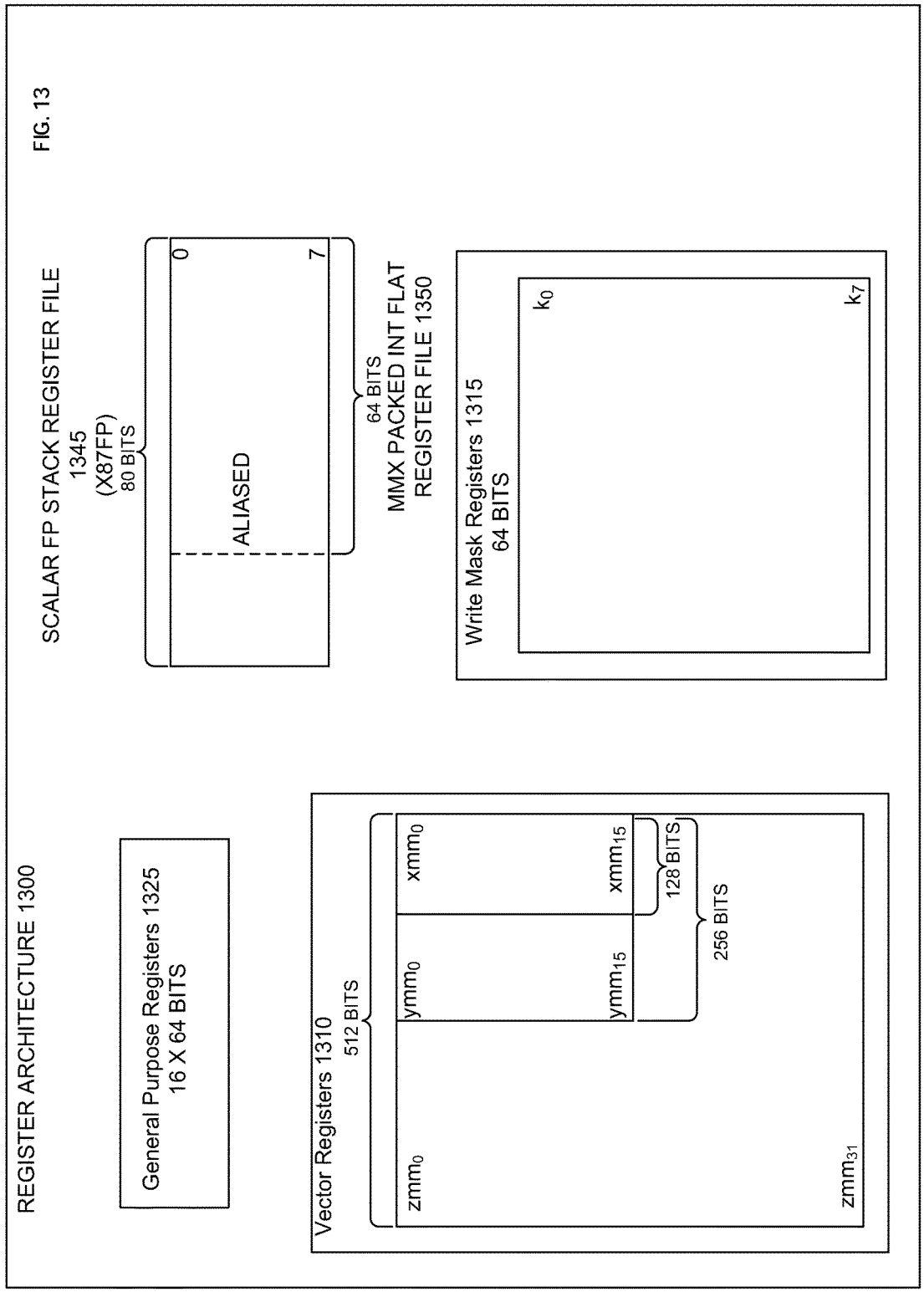

APPARATUS AND METHOD FOR EFFICIENT GATHER AND SCATTER OPERATIONS

BACKGROUND

Field of the Invention

This invention relates generally to the field of computer processors. More particularly, the invention relates to an apparatus and method for performing efficient gather and scatter operations.

Description of the Related Art

"Gather" and "scatter" operations are used to work with large, sparsely populated matrices. For example, existing computer processors perform gather operations to collect the elements of a matrix from memory and store them in a highly compressed format (e.g., sorted contiguously in an ordered array). Conversely, to perform various matrix operations (e.g., matrix multiplication) existing computer processors execute scatter operations to reproduce the previously-gathered matrix in memory.

BRIEF DESCRIPTION OF THE DRAWINGS

A better understanding of the present invention can be obtained from the following detailed description in conjunction with the following drawings, in which:

FIGS. 11A and 11B are block diagrams illustrating a generic vector friendly instruction format and instruction templates thereof according to embodiments of the invention;

FIGS. 12A-D are block diagrams illustrating an exemplary specific vector friendly instruction format according to embodiments of the invention; and FIG. 13 is a block diagram of a register architecture according to one embodiment of the invention.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
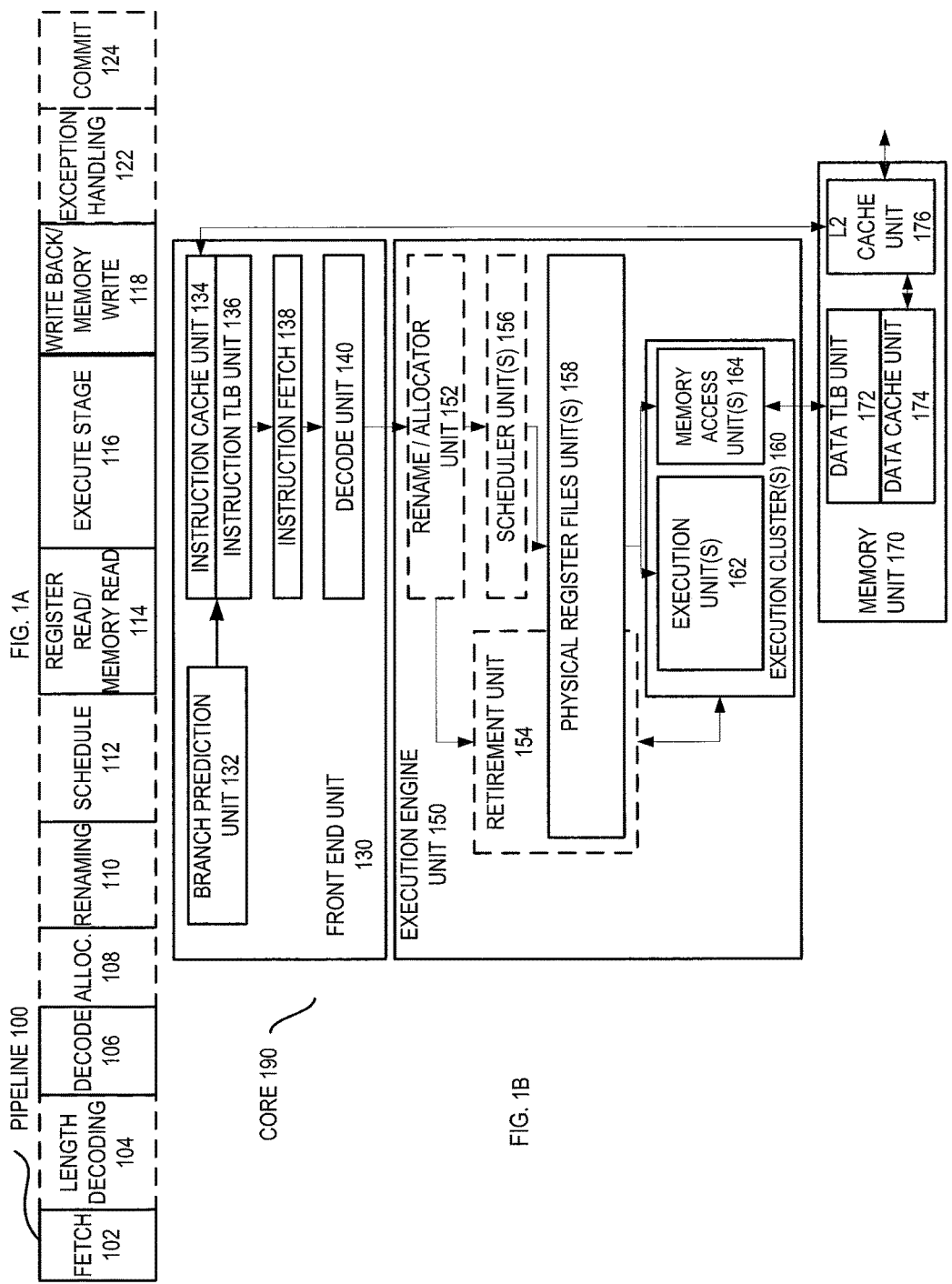
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, microcode entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
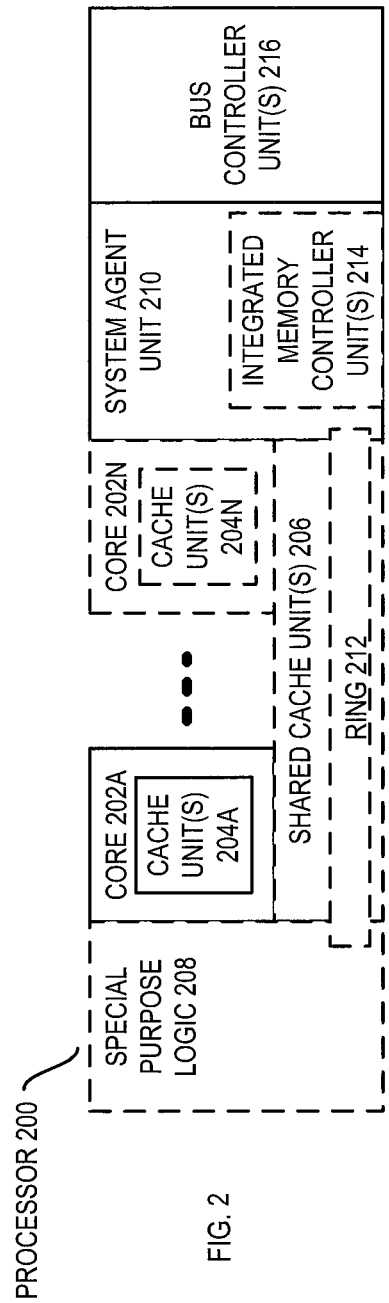
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
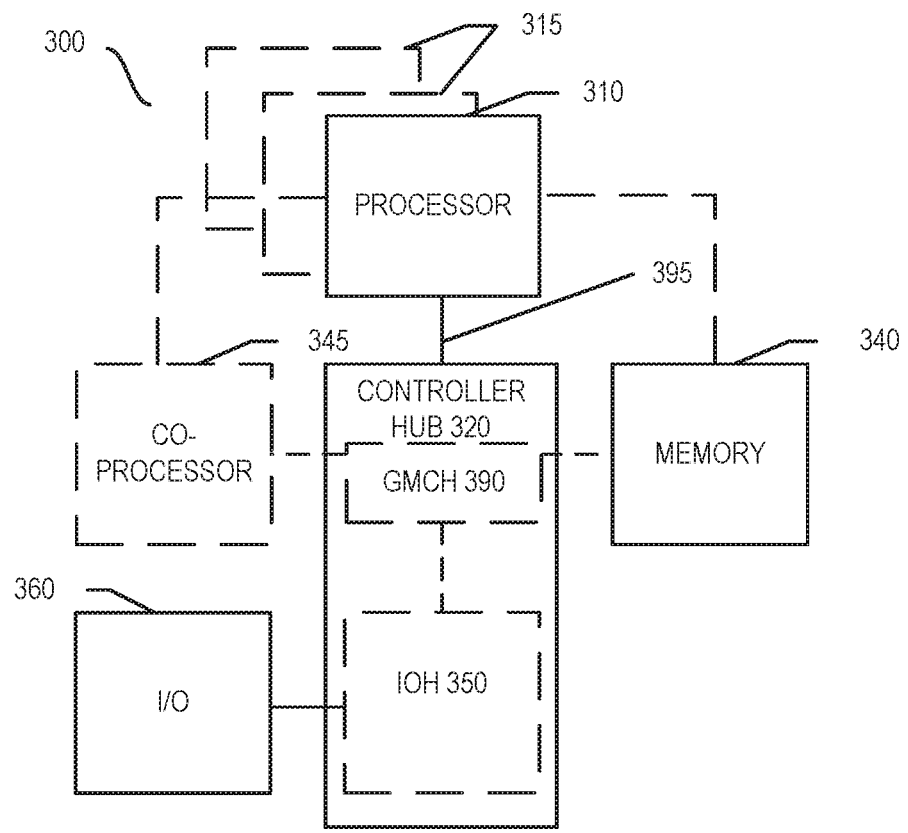
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
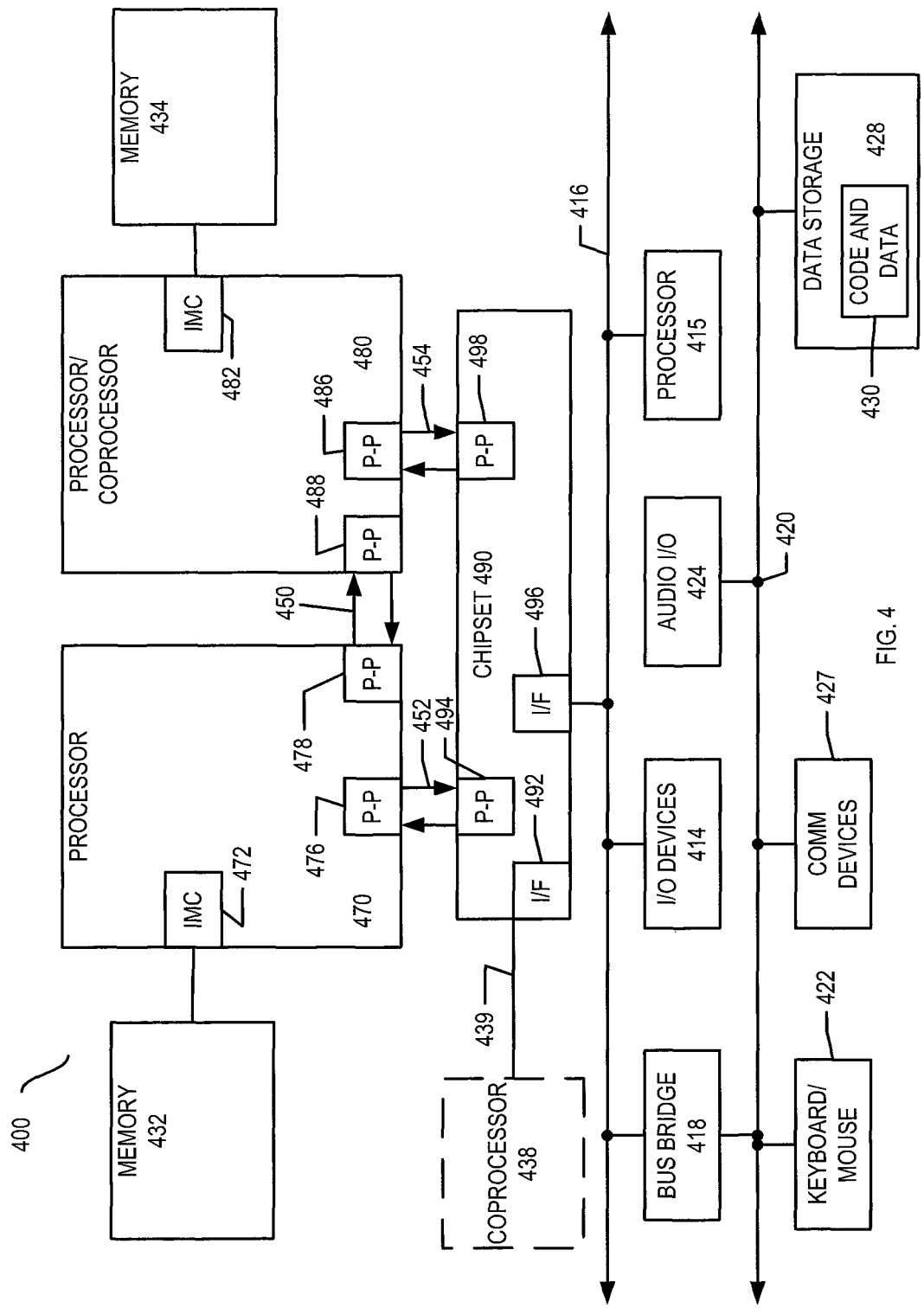
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
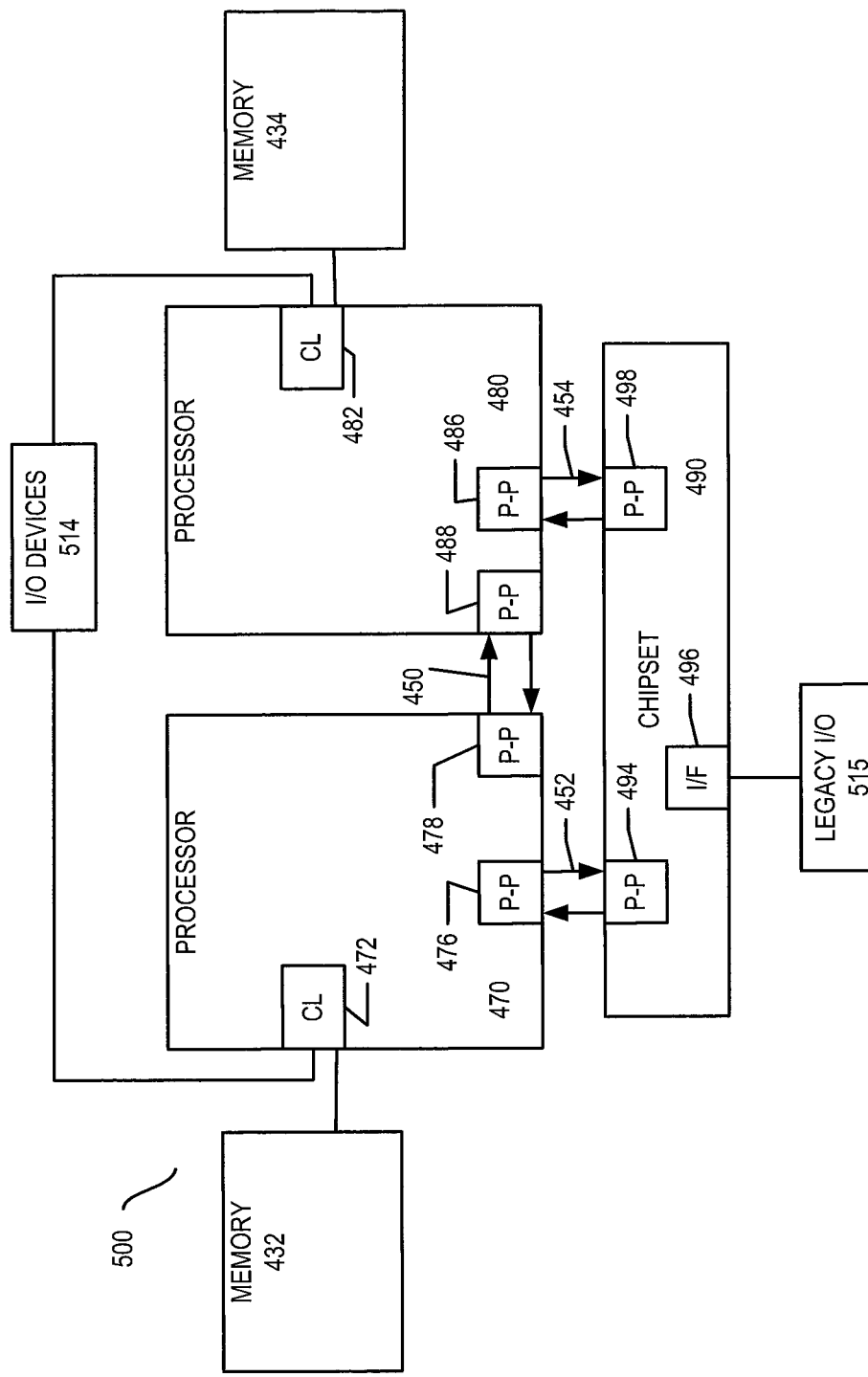
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
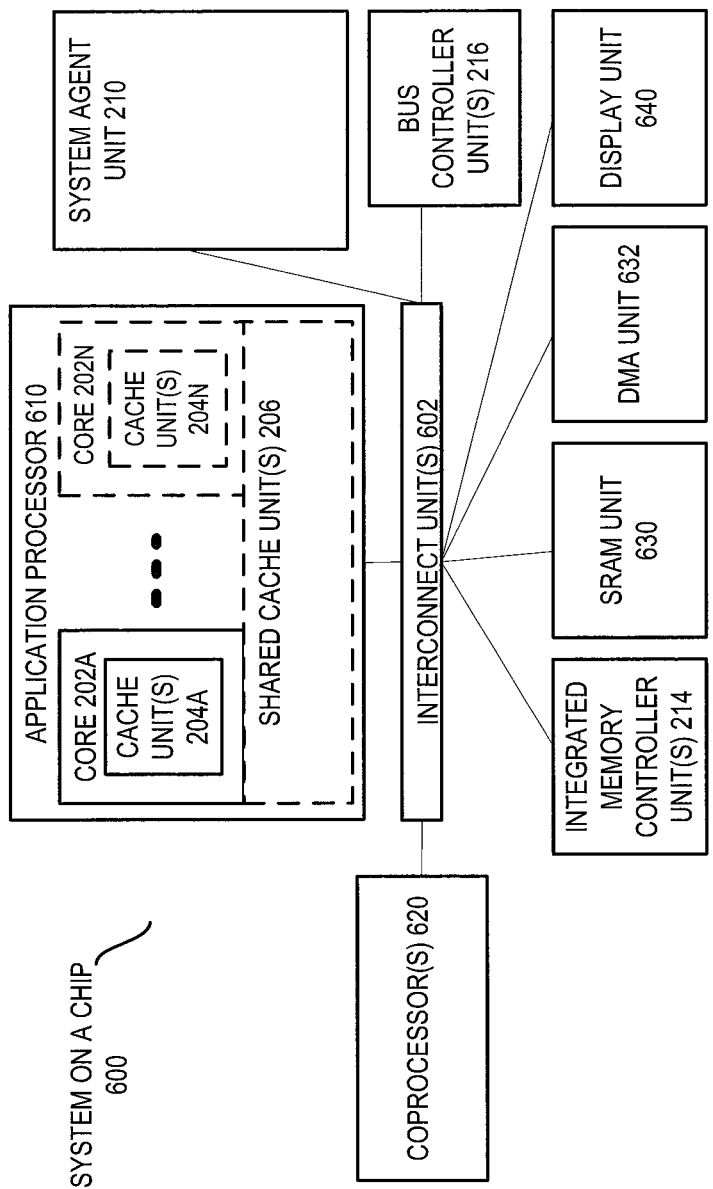
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
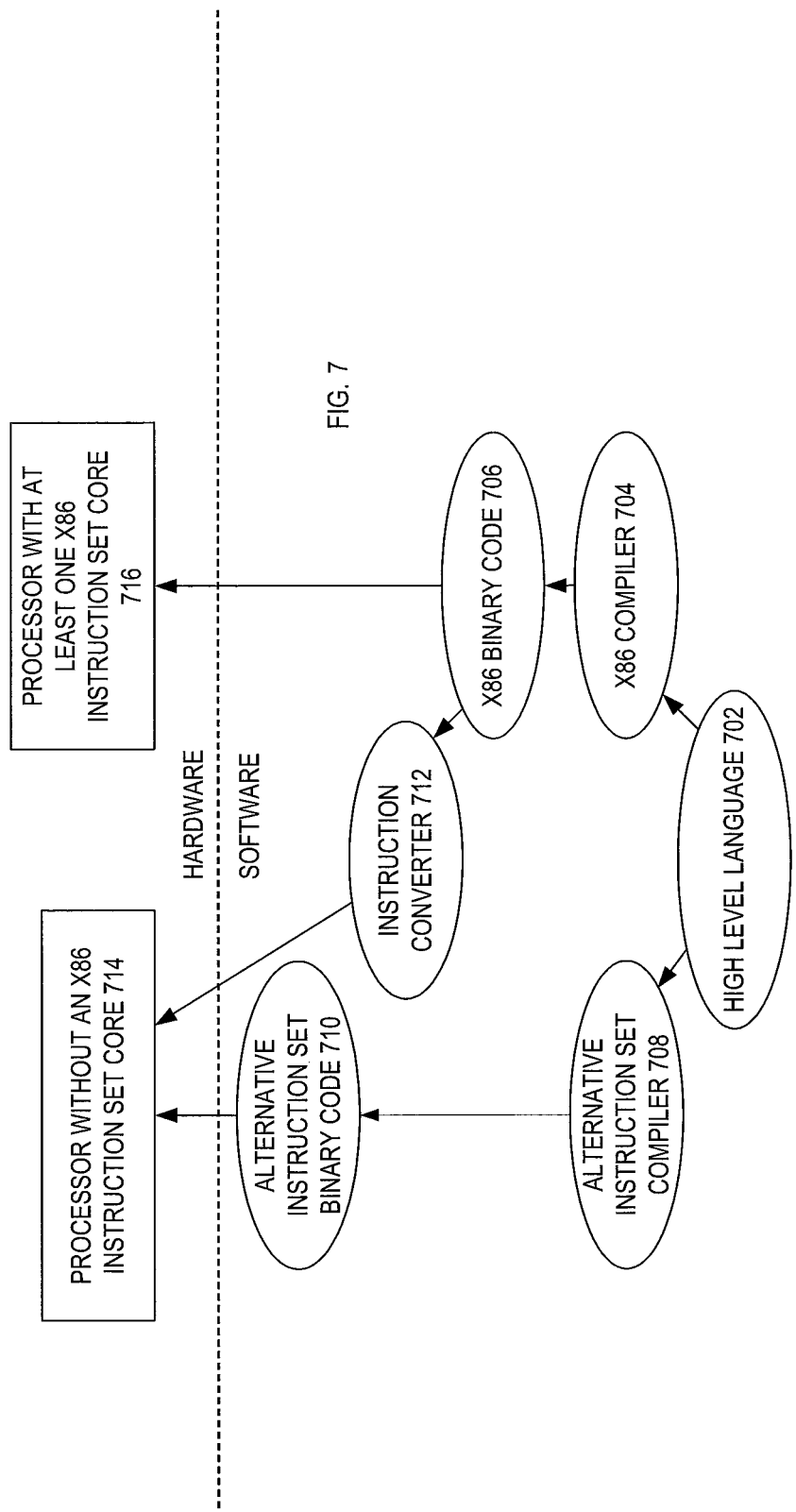
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

System and Method for Efficient Gather and Scatter Operations

The embodiments of the invention described below provide techniques for performing gather and scatter operations in a high-performance manner. While some of the embodiments described below will focus on gather operations, it will be understood that the same principles may be applied to perform other operations such as scatter operations, gather to prefetch lines in the cache, and scatter to prefetch lines (in the exclusive state) in the cache.

In one embodiment, a gather operation takes as inputs:
1) A 64-bit base address in a general-purpose register;
2) A 512-bit index containing 16 element indices in a vector register;
3) A 16-bit mask indicating which elements are to be gathered.

The gather operation outputs its results to a 512-bit vector register and resets the mask bits corresponding to the successfully gathered elements.

Figure 8:
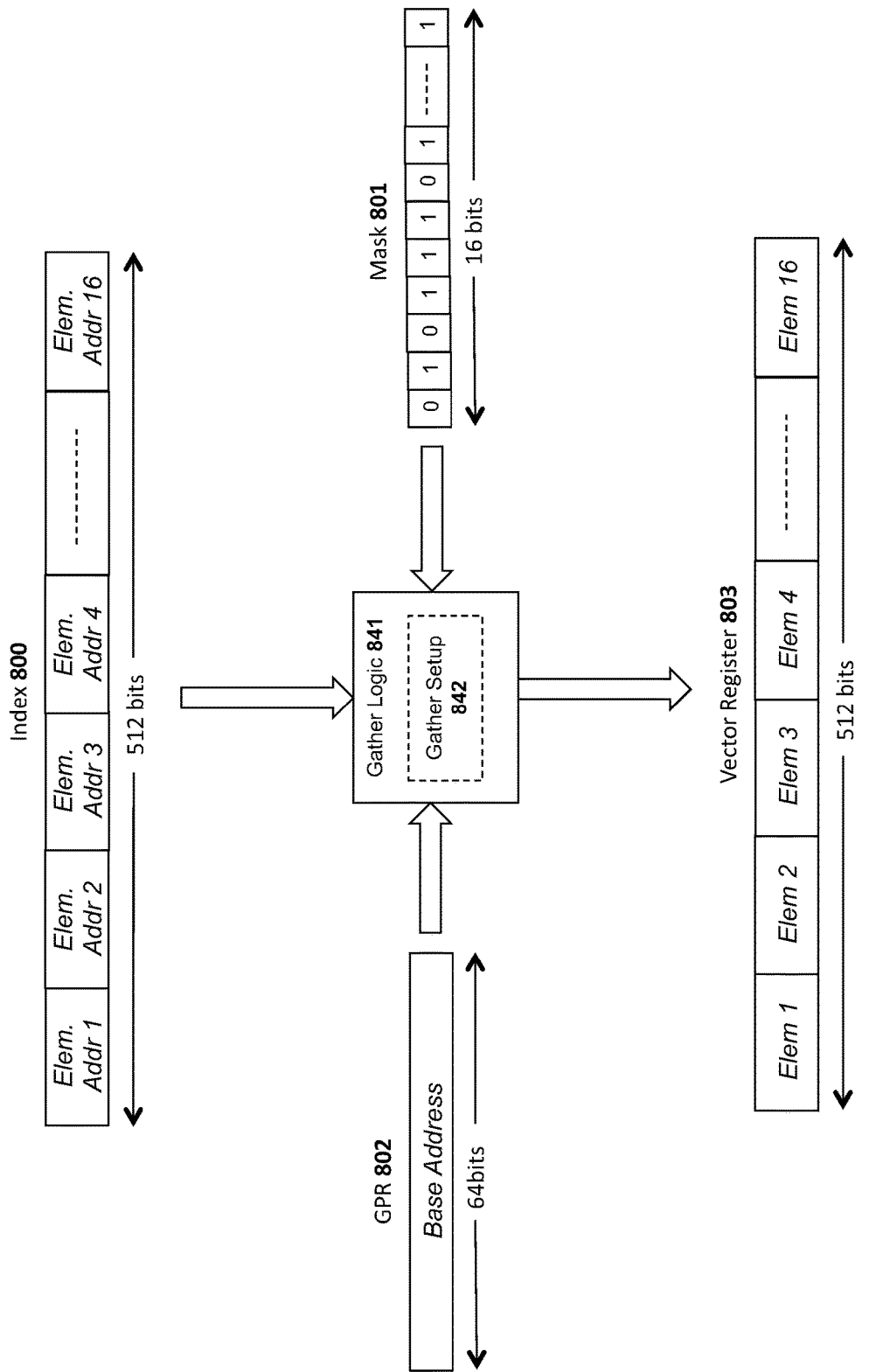
FIG. 8 illustrates a processor architecture in which embodiments of the invention may be implemented.

This functionality is illustrated generally in FIG. 8, which shows a 512-bit index register 800 storing 16 32-bit element indices which are added to a base address stored in GPR 802 for computing gather addresses. A 16-bit mask register 801 stores a bit value which is associated with each data element/address. If the mask register 801 stores a bit value of '1' for a data element, then the gather logic 841 gathers the associated data element and stores the results in a destination vector register 803. If the mask register 801 stores a bit value of '0' for a data element, then the gather logic 841 does not gather the associated data element and store the result in the destination vector register 803. As illustrated, in one embodiment, the destination vector register 803 is a 512-bit vector register for storing 16 32-bit packed/vector data elements (identified as "Elem 1-16").

In one embodiment of the invention, the gather logic 841 includes gather setup logic 842 for performing a set-up phase to enable more efficient gather operations followed by a gather loop. In one embodiment, during the set-up phase, the gather setup logic 842 scans the mask 801 to identify the first element to be gathered, extracts an index from the 16 element indices 800 corresponding to the mask bit from mask register 801, and performs an address computation by adding together the base register 802, index from index register 800, and optional displacement as described herein. The gather setup logic 842 may perform multiple setup instruction/operations to calculate multiple data element addresses prior to the execution of the first gather instruction/operation. As discussed below, in one embodiment, the gather setup logic 842 executes two gather setup instructions/operations prior to the execution of the first gather instruction/operation (see, e.g., FIG. 9B).

In the gather loop, the gather logic 841 resets the mask bit corresponding to the last gathered element, finds the next set mask bit (e.g., the next bit set to '1'), extracts the corresponding index from index register 800, computes the data element address, and loads the data element from memory into the destination vector register 803. The gather loop is repeated until all vector data elements have been gathered. If a page fault or other exception occurs, the mask register 801 contains a bit vector of data elements that have not been gathered successfully.

Figure 9A:
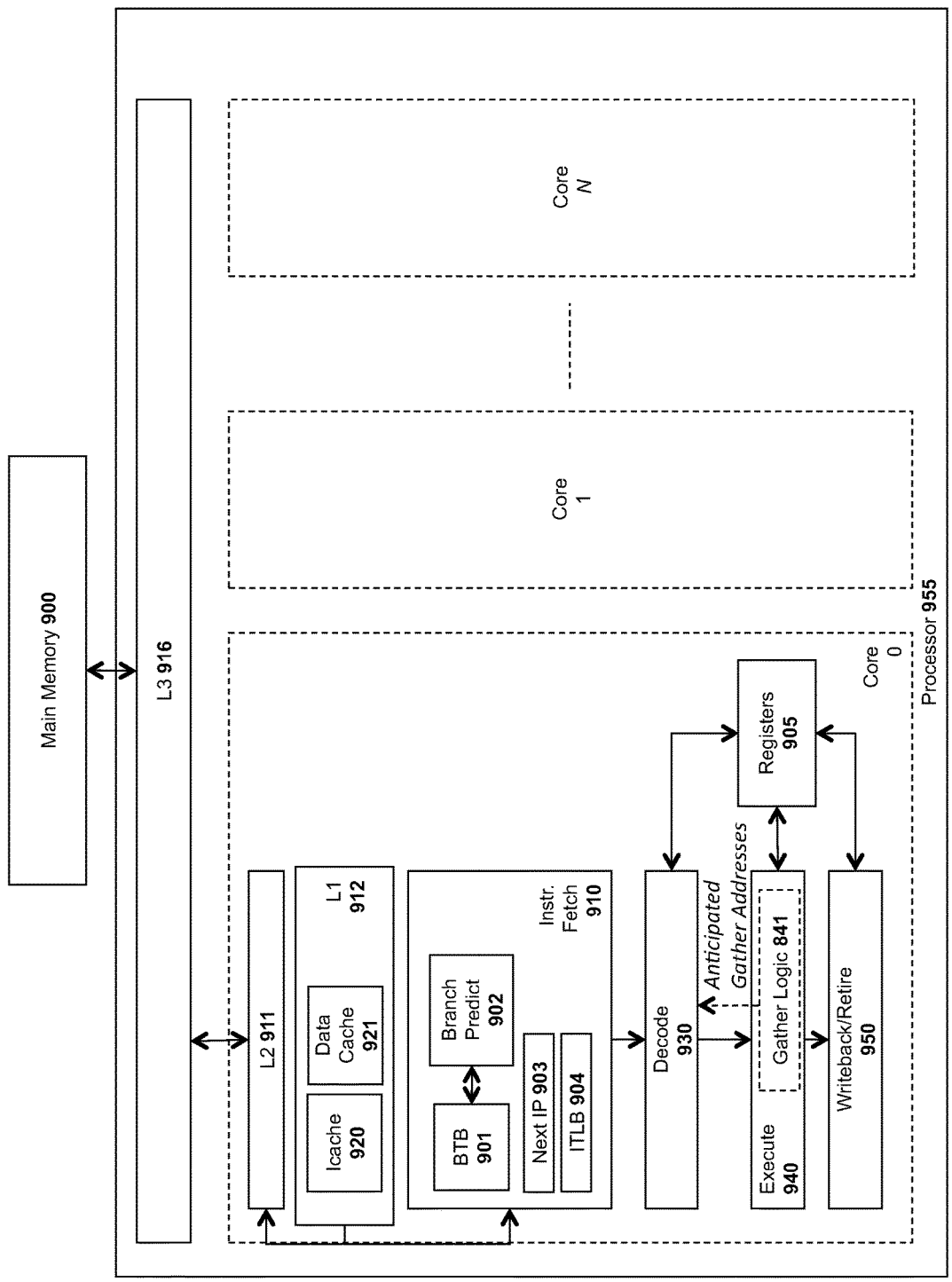
FIGS. 9A-C illustrate efficient gather/scatter operations in accordance with one embodiment of the invention.

As illustrated in FIG. 9A, an exemplary processor 955 on which embodiments of the invention may be implemented includes an execution unit 940 with gather logic 841 to execute gather set-up instructions and gather instructions as described herein. A register set 905 is provided with registers for storing the base address, mask bits, index data elements, and gathered data elements as shown in FIG. 8 as the execution unit 940 executes the gather set-up and gather instructions. Thus, the register set may include both general purpose registers (e.g., for storing the base address) and vector registers (for storing packed/vector data element addresses and packed/vector data elements).

The details of a single processor core ("Core 0") are illustrated in FIG. 9A for simplicity. It will be understood, however, that each core shown in FIG. 9A may have the same set of logic as Core 0. As illustrated, each core may also include a dedicated Level 1(L1) cache 912 and Level 2 (L2) cache 911 for caching instructions and data according to a specified cache management policy. The L1 cache 912 includes a separate instruction cache 920 for storing instructions and a separate data cache 921 for storing data. The instructions and data stored within the various processor caches are managed at the granularity of cache lines which may be a fixed size (e.g. 64, 128, 512 Bytes in length). Each core of this exemplary embodiment has an instruction fetch unit 910 for fetching instructions from main memory 900 and/or a shared Level 3 (L3) cache 916; a decode unit 930 for decoding the instructions (e.g., decoding program instructions into micro-operatons or "uops"); an execution unit 940 for executing the instructions (e.g., the gather set-up instructions as described herein); and a writeback unit 950 for retiring the instructions and writing back the results.

The instruction fetch unit 910 includes various well known components including a next instruction pointer 903 for storing the address of the next instruction to be fetched from memory 900 (or one of the caches); an instruction translation look-aside buffer (ITLB) 904 for storing a map of recently used virtual-to-physical instruction addresses to improve the speed of address translation; a branch prediction unit 902 for speculatively predicting instruction branch addresses; and branch target buffers (BTBs) 901 for storing branch addresses and target addresses. Once fetched, instructions are then streamed to the remaining stages of the instruction pipeline including the decode unit 930, the execution unit 940, and the writeback unit 950. The structure and function of each of these units is well understood by those of ordinary skill in the art and will not be described here in detail to avoid obscuring the pertinent aspects of the different embodiments of the invention.

As mentioned above, the gather logic 841 of one embodiment includes gather setup logic 842 to reduce the pipeline latency between the address generation and vector execution of the gather instructions. One embodiment of the invention includes a set-up instruction/operation, referred to herein as "vgatherpf0hintdps," that performs the set-up phase of the gather operation. The set-up instruction "primes" the gather hardware so that a subsequent gather instruction can execute gather operations more efficiently. Once primed, the gather loop runs at full speed.

An exemplary gather sequence shown in pseudocode follows:

```
mov rax, __linaddr vector__load__data64__indices
mov rbx, __linaddr vector__load__data64__base
vmovaps v1, [rax]
mov eax, 0xffff
kmovd k1, rax ; set 16-bit mask to all ones
;Gather Set-up
vgatherpf0hintdps v2 {k1}, [rbx+v1] ; first gather
                                                set-up
vgatherpf0hintdps v2 {k1}, [rbx+v1] ; second gather
                                                set-up
;Gather loop
loop1:
vgatherdps v2 {k1}, [rbx+v1] ; gather loop
vgatherdps v2 {k1}, [rbx+v1] ; gather two elements per
                                                iteration
jknz k1,loop1
```

The two gather set-up instructions "vgatherpf0hintdps" shown above compute speculative state in the gather logic 841 that allows the subsequent gather instructions "vgatherdps" to execute without an initial delay. In one embodiment, the speculative state does not become part of the architectural state and may be discarded without affecting the correctness of the gather operations. While the exemplary embodiment shows two gather set-up instructions to speculatively compute the first two iterations of the gather loop, a different number of gather set-up instructions may be used depending on the implementation (e.g., based on the multithreading capabilities of the processor on which the embodiments of the invention are employed).

Figure 9B:
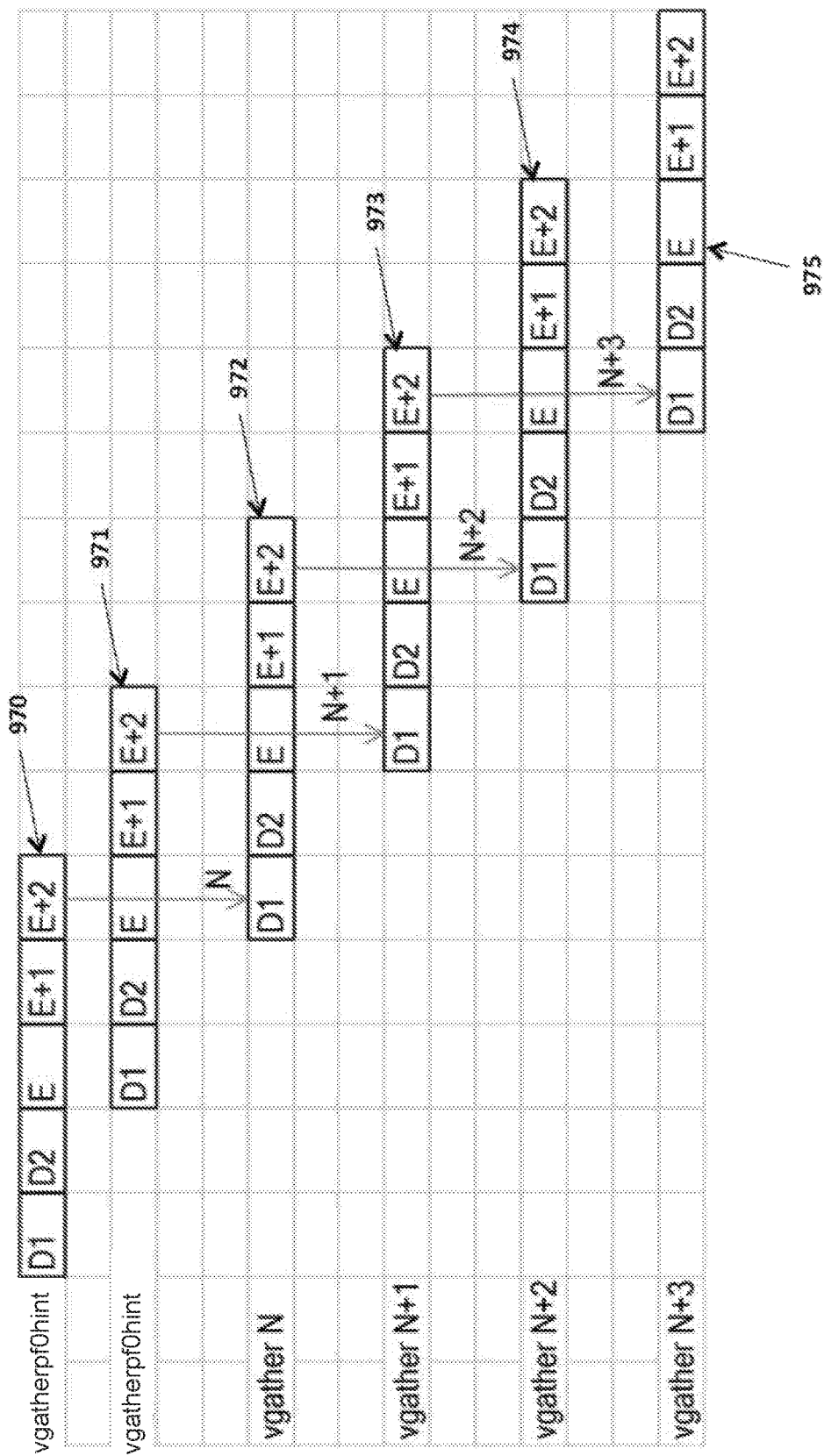

A diagram showing the execution of one embodiment of the above code sequence is shown in FIG. 9B. As illustrated, the gather address computed in the E+2 pipeline stage by gather setup instruction 970 is forwarded back to the address generation in the D1 decode pipeline stage for vgather instruction 972. Similarly, the gather address computed in the E+2 pipeline stage by gather setup instruction 971 is forwarded back to the address generation in the D1 decode pipeline stage for vgather instruction 973. This operation is represented in FIG. 9A with an arrow from the execution unit 940 back to the decode unit 930 (showing that "anticipated gather addresses" are provided). It will be appreciated, of course, that the actual gather addresses may be stored in registers of the register file 905 and made accessible to the decoder unit 930 (rather than being provided directly to the decoder 930).

Two iterations of the gather loop are employed in the illustrated embodiment to recover a four clock pipeline latency which would result without the use of the gather setup instructions described herein. In the illustrated embodiment, it is assumed that two threads are running so that the slots left over from the thread performing the gather are available for use by the other thread. It should be noted, however, that the underlying principles of the invention are not limited to any particular number of concurrently executing threads.

In one embodiment, the gather set-up instructions update only a "speculative" state in the internal hardware, not the actual architectural state. In this embodiment, the gather set-up instructions may be treated as NOPs (no operations) from the point of view of the instruction set architecture (ISA); they change no architectural state and raise no memory exceptions. Consequently, the processor 955 may discard the speculative state (as a result of an interrupt, for example) without affecting the correctness of the gather operations. In one embodiment, if the speculative state generated by the gather set-up instructions is discarded, the first gather would then incur a start-up penalty as if no gather set-up instructions had been executed (e.g., 4-5 clocks in one embodiment). In one embodiment, the processor 955 discards the speculative state whenever the index register 800 or mask register 801 are written by software, or whenever a serializing instruction is executed.

In one embodiment of the invention, the gather logic 841 verifies that the gather set-up instructions' register operands and type conversion exactly match those of the gather instructions. If a mismatch is detected, then the first gather instruction incurs a start-up penalty as if no gather set-up instructions had been executed (e.g., 4-5 clocks in one embodiment).

Gather instructions inherently require more time to compute addresses than single-element loads and stores. This is due to the need for the gather instructions to identify the element to be gathered (by performing a find-first-one on the mask value), extract the corresponding index from the array of indices in the vector index register, and then do the usual address computation. The embodiments of the invention described herein provide techniques to overlap this latency with other useful work in an in-order processor. It should be noted, however, that the underlying principles of the invention may also be implanted in an out-of-order processor.

Figure 10A:
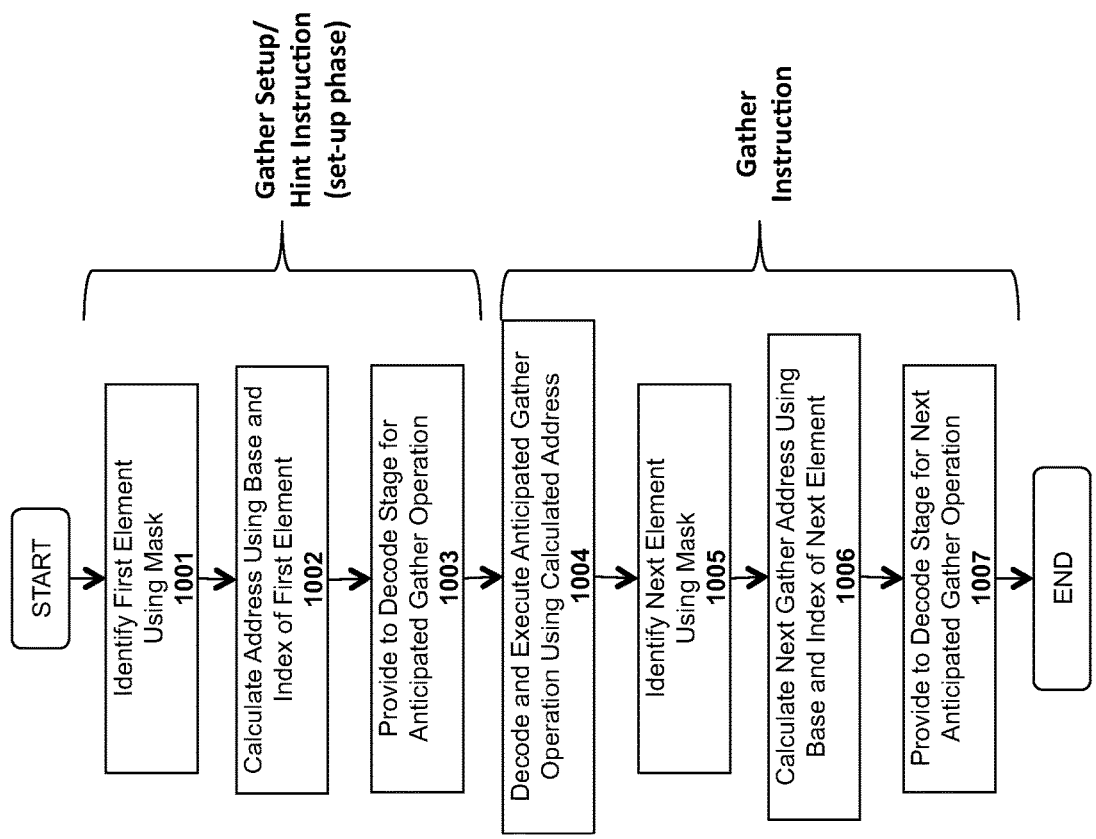
FIGS. 10A-B illustrate methods for performing efficient gather/scatter operations in accordance with one embodiment of the invention.

A method in accordance with one embodiment of the invention is illustrated in FIG. 10A. The method may be implemented on the architecture shown in FIG. 9A but is not limited to such an architecture. At 901, the first data element to be gathered is identified via the mask register bit. In one embodiment, the first bit having a value of '1' identifies the first data element to be gathered. At 1002, the address of the first element is calculated by adding the base address (stored in a GPR 802) to the element index associated with the mask bit (stored in the element index register 800). At 1003, the calculated address is made available to the decode stage of the pipeline to be used by a subsequent gather instruction.

The operations 1001-1003 may be executed multiple times in a pipelined manner to calculate multiple addresses for subsequent gather instructions. For example, as shown in FIG. 9B, two instances of the gather setup instructions, 970 and 971, may be executed concurrently in different stages of the processing pipeline to generate addresses for two subsequent gather instructions, 972 and 973, respectively.

At 1004, the gather instruction is executed using the speculative gather address calculated in operations 1001-1003, resulting in one or more data elements being gathered and stored in the destination vector register. As mentioned above, in one embodiment, the gather operation identifies the data element to be gathered by scanning the mask register and identifying the first instance of a value of '1' (i.e., the next data element to be gathered is the data element associated with the first non-zero mask value). In one embodiment, after the data element is gathered at 1004, the mask bit associated with that element is set to '0' to indicate that the gather operation is complete. At 1005, the gather instruction identifies the next data element to be gathered using the mask. Because the mask value for the previous data element was reset to '1', the next non-zero value in the mask register is used to identify the next data element to be gathered. At 1006, the gather operation calculates the next gather address using the base address and index of the next data element and, at 1007, this information is provided to the decode stage to be used by a subsequent gather instruction.

In one embodiment, multiple iterations of operations 1004-1007 may be performed for multiple gather instruction/operations. For example, as illustrated in FIG. 9B, following the gather setup instructions 970-971, the first gather instruction (vgather N) 972 calculates the gather address for the third gather instruction (vgather N+2) 974 to be used by the decode stage D1 of the third gather instruction 974. Similarly, the second gather instruction (vgather N+1) 973 calculates the gather address for the fourth gather instruction (vgather N+3) 975 to be used by the decode stage D1 of the fourth gather instruction. Thus, once the gather setup instructions 970-971 has primed the pipeline with the first two gather addresses, each gather instruction calculates an address for a subsequent gather instruction until each data element has been successfully gathered and stored in the destination vector register 803.

While the embodiments described above utilize instructions to calculate gather addresses for subsequent instructions which are two iterations behind, this specific configuration is not required for complying with the underlying principles of the invention. For example, depending on the architecture of the processor pipeline, instructions may separated by a single iteration or three or more iterations while still complying with the underlying principles of the invention.

As mentioned above, in one embodiment, the gather/scatter set-up instruction is used to compute an internal processor gather/scatter state that makes subsequent gather/scatter operations execute faster. To do that, in one embodiment, the processor hardware computes and maintains internal gather/scatter state and compares each gather/scatter set-up instruction and gather/scatter instruction against the internal gather/scatter state to make sure that they correspond. For example, the gather logic 841 may verify that the gather set-up instructions' register operands and type conversion exactly match those of the gather instructions. If they match, the gather is processed in a "fast" manner by using the pre-computed internal state. If they don't match, the hardware resets the internal state and re-computes the state for the new gather (causing a 4-5 clock penalty). A reset can also be caused by software writing to the gather index or mask register. The gather set-up instructions allow the processor to compute this internal state without stalls.

Figure 9C:
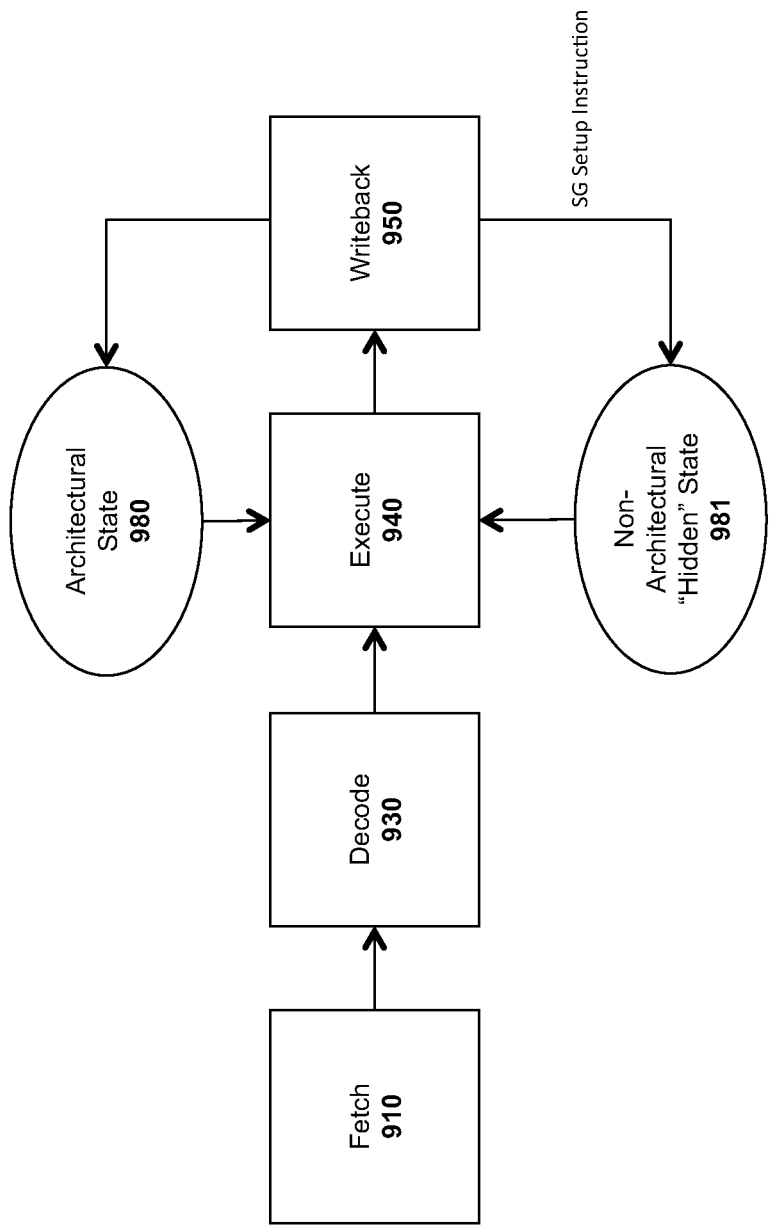

FIG. 9C illustrates a processor pipeline comprising a fetch stage 910, a decode stage 930, an execute stage 940 and a writeback stage 950, which may perform the same or similar functions as described above with respect to FIG. 9A. As illustrated, in the writeback stage 950, scatter/gather setup instructions, when successfully executed, may cause the non-architectural (i.e., "hidden") state 981 of the processor to be updated (e.g., with the addresses resulting from the execution of the scatter/gather setup instructions). The non-architectural state may then be used by a subsequent scatter/gather instruction to execute more efficiently (after ensuring a match between the setup instruction and the scatter/gather instruction as described above). In addition, as illustrated in FIG. 9C, the successful execution of a scatter/gather instruction causes the real architectural state 980 of the processor to be updated and used by subsequent instructions (including subsequent scatter/gather instructions).

Figure 10B:
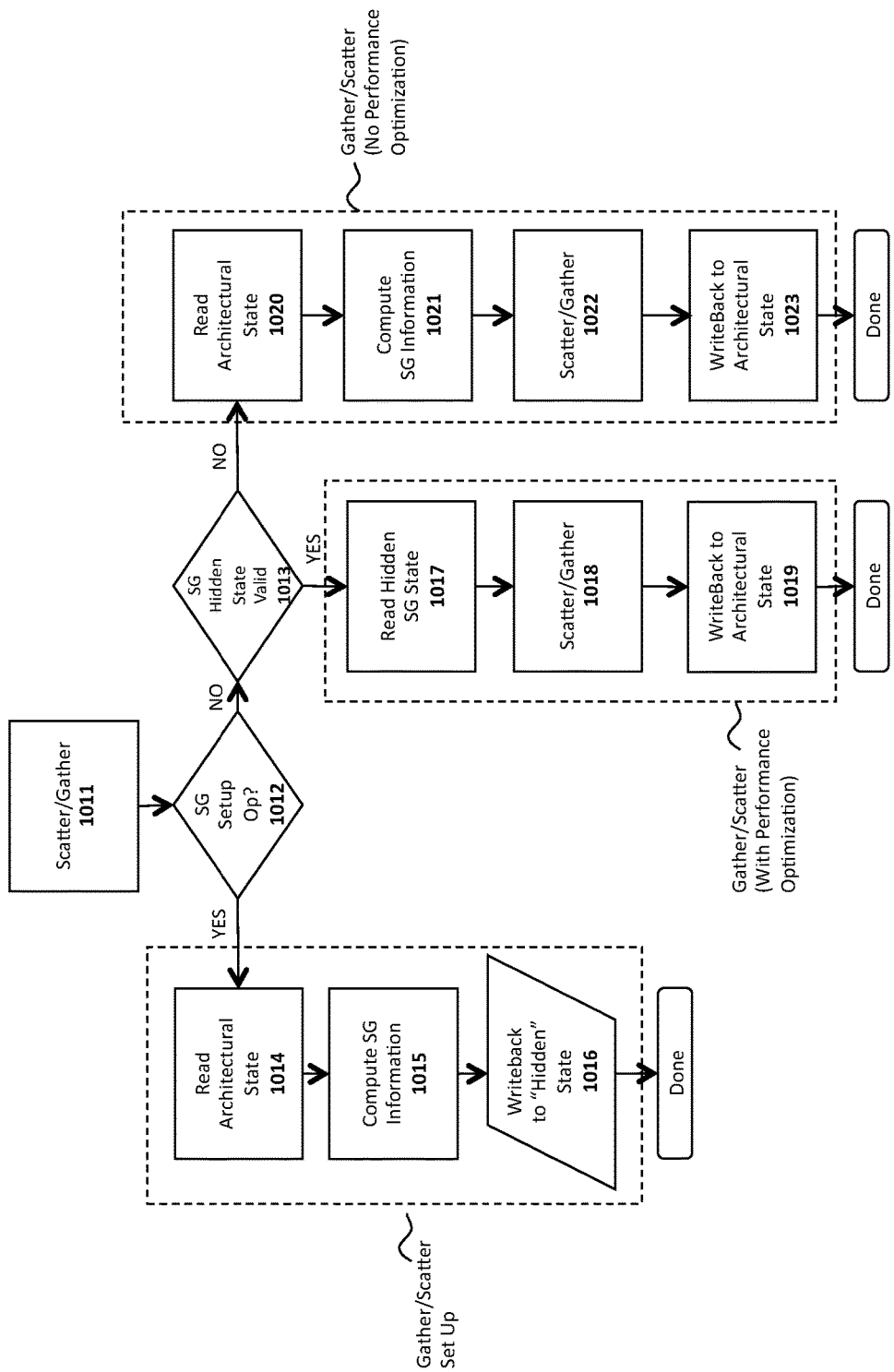

FIG. 10B illustrates another method for performing efficient gather/scatter operations which shows the writeback operations to either the non-architectural/hidden state or the real architectural state of the processor. At 1011, a scatter/gather instruction is initiated. If the operation is a scatter/gather setup instruction, determined at 1012, then at 1014, the current architectural state is read. For example, as discussed above, the current base address, indices, and mask values for data elements to be scattered/gathered may be read from the architectural state. Using the current architectural state information, the scatter/gather setup instruction performs its operations (as described above) and, at 1016, stores the results in non-architectural/hidden processor state.

If the current scatter/gather operation is not a setup operation, determined at 1012, then at 1013, a determination is made as to whether the scatter/gather hidden state is valid. For example, as mentioned, the gather logic 841 may verify that the gather set-up instructions' register operands and type conversion exactly match those of the gather instructions. If so, then at 1017, the non-architectural/hidden state is read at 1017 and used for the execution of the scatter/gather instruction at 1018 (e.g., by utilizing the pre-calculated data element addresses). At 1019, once the scatter/gather instruction is complete, the results are written back to the processor architectural state.

If, at 1013, a determination is made that the scatter/gather non-architectural/hidden state is invalid (e.g., because register operands and/or type conversion do not match), then the scatter/gather instruction executes without the performance benefits provided by the scatter/gather setup instruction. At 1020, the scatter/gather instruction reads the current architectural state and, at 1021, calculates the scatter/gather information needed to perform the scatter/gather operations (e.g., calculating the data element addresses as described herein). Once the information is calculated, the scatter/gather instruction performs scatter/gather operation(s) at 1022 (e.g., using the calculated element addresses to scatter/gather data elements). Finally, at 1023, the architectural state of the processor is updated with the results. For example, each scatter/gather instruction may calculate an address to be used for a subsequent iteration of the scatter/gather instruction, as described above with respect to FIG. 9B.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 11B:
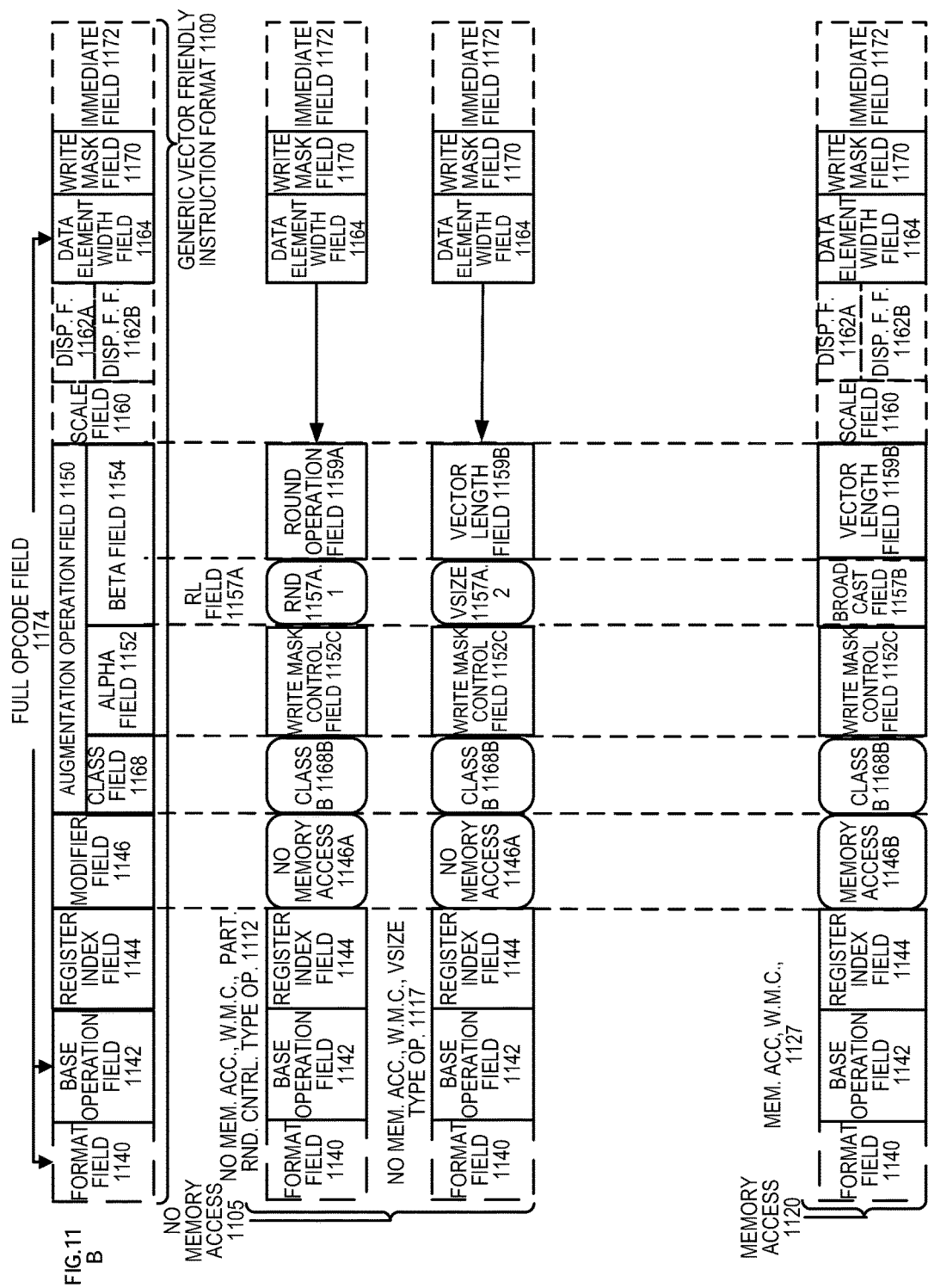

FIGS. 11A-11B are block diagrams illustrating a generic vector friendly instruction format and instruction templates thereof according to embodiments of the invention. FIG. 11A is a block diagram illustrating a generic vector friendly instruction format and class A instruction templates thereof according to embodiments of the invention; while FIG. 11B is a block diagram illustrating the generic vector friendly instruction format and class B instruction templates thereof according to embodiments of the invention. Specifically, a generic vector friendly instruction format 1100 for which are defined class A and class B instruction templates, both of which include no memory access 1105 instruction templates and memory access 1120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 11A include: 1) within the no memory access 1105 instruction templates there is shown a no memory access, full round control type operation 1110 instruction template and a no memory access, data transform type operation 1115 instruction template; and 2) within the memory access 1120 instruction templates there is shown a memory access, temporal 1125 instruction template and a memory access, non-temporal 1130 instruction template. The class B instruction templates in FIG. 11B include: 1) within the no memory access 1105 instruction templates there is shown a no memory access, write mask control, partial round control type operation 1112 instruction template and a no memory access, write mask control, vsize type operation 1117 instruction template; and 2) within the memory access 1120 instruction templates there is shown a memory access, write mask control 1127 instruction template.

The generic vector friendly instruction format 1100 includes the following fields listed below in the order illustrated in FIGS. 11A-11B.

Format field 1140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1142—its content distinguishes different base operations.

Register index field 1144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1146—its content distinguishes occurrences of instructions in the generic vector instruction format that specify memory access from those that do not; that is, between no memory access 1105 instruction templates and memory access 1120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1150—its content distinguishes which one of a variety of different operations to be performed in addition to the base operation. This field is context specific. In one embodiment of the invention, this field is divided into a class field 1168, an alpha field 1152, and a beta field 1154. The augmentation operation field 1150 allows common groups of operations to be performed in a single instruction rather than 2, 3, or 4 instructions.

Scale field 1160—its content allows for the scaling of the index field's content for memory address generation (e.g., for address generation that uses $2^{scale}*\text{index}+\text{base}$).

Displacement Field 1162A—its content is used as part of memory address generation (e.g., for address generation that uses $2^{scale}*\text{index}+\text{base}+\text{displacement}$).

Displacement Factor Field 1162B (note that the juxtaposition of displacement field 1162A directly over displacement factor field 1162B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1174 (described herein) and the data manipulation field 1154C. The displacement field 1162A and the displacement factor field 1162B are optional in the sense that they are not used for the no memory access 1105 instruction templates and/or different embodiments may implement only one or none of the two.

Data element width field 1164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1170 allows for partial vector operations, including loads, stores, arithmetic, logical, etc. While embodiments of the invention are described in which the write mask field's 1170 content selects one of a number of write mask registers that contains the write mask to be used (and thus the write mask field's 1170 content indirectly identifies that masking to be performed), alternative embodiments instead or additional allow the mask write field's 1170 content to directly specify the masking to be performed.

Immediate field 1172—its content allows for the specification of an immediate. This field is optional in the sense that is it not present in an implementation of the generic vector friendly format that does not support immediate and it is not present in instructions that do not use an immediate.

Class field 1168—its content distinguishes between different classes of instructions. With reference to FIGS. 11A-B, the contents of this field select between class A and class B instructions. In FIGS. 11A-B, rounded corner squares are used to indicate a specific value is present in a field (e.g., class A 1168A and class B 1168B for the class field 1168 respectively in FIGS. 11A-B).

Instruction Templates of Class A

In the case of the non-memory access 1105 instruction templates of class A, the alpha field 1152 is interpreted as an RS field 1152A, whose content distinguishes which one of the different augmentation operation types are to be performed (e.g., round 1152A.1 and data transform 1152A.2 are respectively specified for the no memory access, round type operation 1110 and the no memory access, data transform type operation 1115 instruction templates), while the beta field 1154 distinguishes which of the operations of the specified type is to be performed. In the no memory access 1105 instruction templates, the scale field 1160, the displacement field 1162A, and the displacement scale filed 1162B are not present.

No-Memory Access Instruction Templates—Full Round Control Type Operation

In the no memory access full round control type operation 1110 instruction template, the beta field 1154 is interpreted as a round control field 1154A, whose content(s) provide static rounding. While in the described embodiments of the invention the round control field 1154A includes a suppress all floating point exceptions (SAE) field 1156 and a round operation control field 1158, alternative embodiments may support may encode both these concepts into the same field or only have one or the other of these concepts/fields (e.g., may have only the round operation control field 1158).

SAE field 1156—its content distinguishes whether or not to disable the exception event reporting; when the SAE field's 1156 content indicates suppression is enabled, a given instruction does not report any kind of floating-point exception flag and does not raise any floating point exception handler.

Round operation control field 1158—its content distinguishes which one of a group of rounding operations to perform (e.g., Round-up, Round-down, Round-towards-zero and Round-to-nearest). Thus, the round operation control field 1158 allows for the changing of the rounding mode on a per instruction basis. In one embodiment of the invention where a processor includes a control register for specifying rounding modes, the round operation control field's 1150 content overrides that register value.

No Memory Access Instruction Templates—Data Transform Type Operation

In the no memory access data transform type operation 1115 instruction template, the beta field 1154 is interpreted as a data transform field 1154B, whose content distinguishes which one of a number of data transforms is to be performed (e.g., no data transform, swizzle, broadcast).

In the case of a memory access 1120 instruction template of class A, the alpha field 1152 is interpreted as an eviction hint field 1152B, whose content distinguishes which one of the eviction hints is to be used (in FIG. 11A, temporal 1152B.1 and non-temporal 1152B.2 are respectively specified for the memory access, temporal 1125 instruction template and the memory access, non-temporal 1130 instruction template), while the beta field 1154 is interpreted as a data manipulation field 1154C, whose content distinguishes which one of a number of data manipulation operations (also known as primitives) is to be performed (e.g., no manipulation; broadcast; up conversion of a source; and down conversion of a destination). The memory access 1120 instruction templates include the scale field 1160, and optionally the displacement field 1162A or the displacement scale field 1162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1152 is interpreted as a write mask control (Z) field 1152C, whose content distinguishes whether the write masking controlled by the write mask field 1170 should be a merging or a zeroing.

In the case of the non-memory access 1105 instruction templates of class B, part of the beta field 1154 is interpreted as an RL field 1157A, whose content distinguishes which one of the different augmentation operation types are to be performed (e.g., round 1157A.1 and vector length (VSIZE) 1157A.2 are respectively specified for the no memory access, write mask control, partial round control type operation 1112 instruction template and the no memory access, write mask control, VSIZE type operation 1117 instruction template), while the rest of the beta field 1154 distinguishes which of the operations of the specified type is to be performed. In the no memory access 1105 instruction templates, the scale field 1160, the displacement field 1162A, and the displacement scale filed 1162B are not present.

In the no memory access, write mask control, partial round control type operation 1110 instruction template, the rest of the beta field 1154 is interpreted as a round operation field 1159A and exception event reporting is disabled (a given instruction does not report any kind of floating-point exception flag and does not raise any floating point exception handler).

Round operation control field 1159A—just as round operation control field 1158, its content distinguishes which one of a group of rounding operations to perform (e.g., Round-up, Round-down, Round-towards-zero and Round-to-nearest). Thus, the round operation control field 1159A allows for the changing of the rounding mode on a per instruction basis. In one embodiment of the invention where a processor includes a control register for specifying rounding modes, the round operation control field's 1150 content overrides that register value.

In the no memory access, write mask control, VSIZE type operation 1117 instruction template, the rest of the beta field 1154 is interpreted as a vector length field 1159B, whose content distinguishes which one of a number of data vector lengths is to be performed on (e.g., 128, 256, or 512 byte).

In the case of a memory access 1120 instruction template of class B, part of the beta field 1154 is interpreted as a broadcast field 1157B, whose content distinguishes whether or not the broadcast type data manipulation operation is to be performed, while the rest of the beta field 1154 is interpreted the vector length field 1159B. The memory access 1120 instruction templates include the scale field 1160, and optionally the displacement field 1162A or the displacement scale field 1162B.

With regard to the generic vector friendly instruction format 1100, a full opcode field 1174 is shown including the format field 1140, the base operation field 1142, and the data element width field 1164. While one embodiment is shown where the full opcode field 1174 includes all of these fields, the full opcode field 1174 includes less than all of these fields in embodiments that do not support all of them. The full opcode field 1174 provides the operation code (opcode).

The augmentation operation field 1150, the data element width field 1164, and the write mask field 1170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Figure 12D:
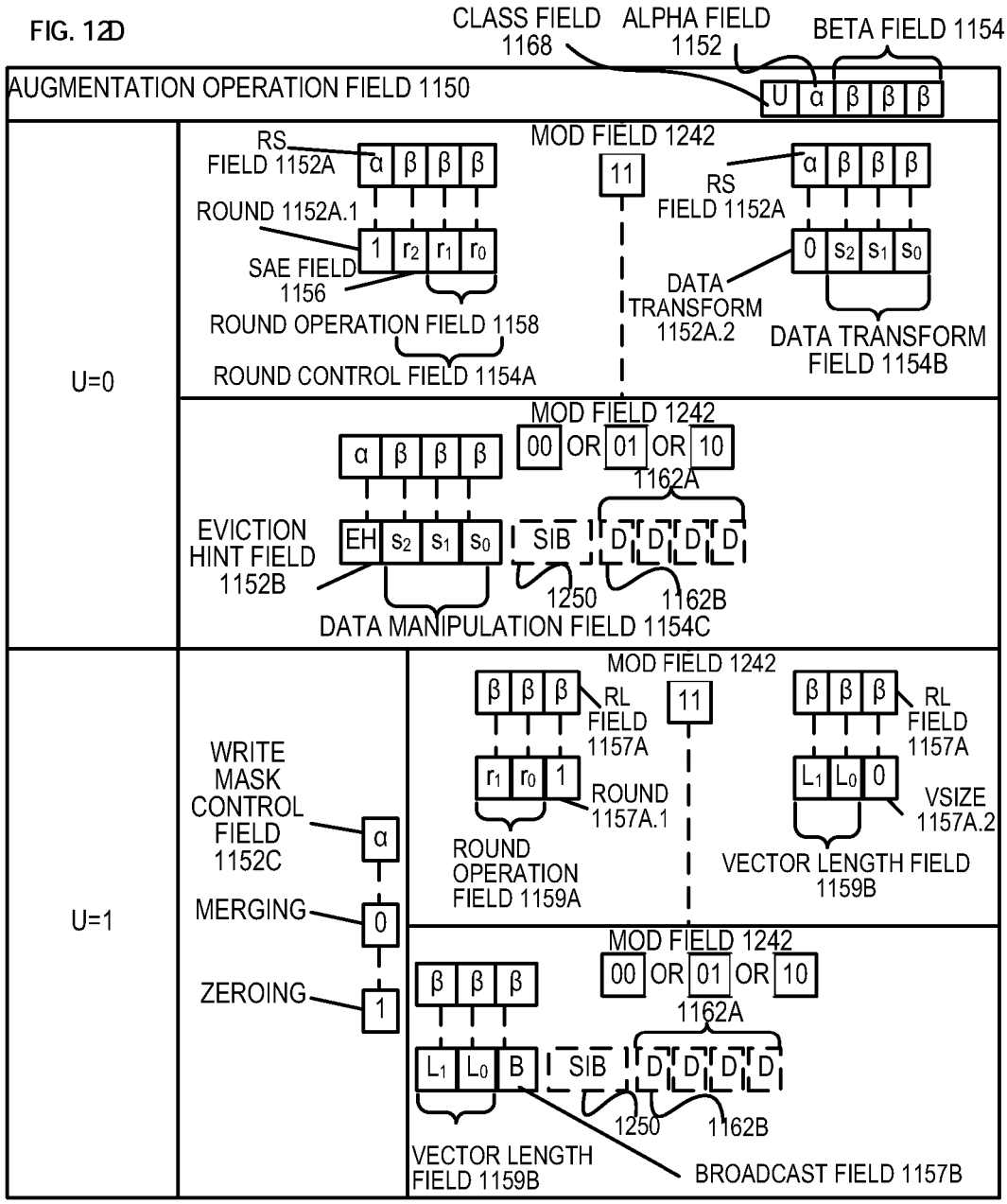

FIGS. 12A-D are block diagrams illustrating an exemplary specific vector friendly instruction format according to embodiments of the invention. FIG. 12A shows a specific vector friendly instruction format 1200 that is specific in the sense that it specifies the location, size, interpretation, and order of the fields, as well as values for some of those fields. The specific vector friendly instruction format 1200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 11 into which the fields from FIG. 12A map are illustrated.

It should be understood that, although embodiments of the invention are described with reference to the specific vector friendly instruction format 1200 in the context of the generic vector friendly instruction format 1100 for illustrative purposes, the invention is not limited to the specific vector friendly instruction format 1200 except where claimed. For example, the generic vector friendly instruction format 1100 contemplates a variety of possible sizes for the various fields, while the specific vector friendly instruction format 1200 is shown as having fields of specific sizes. By way of specific example, while the data element width field 1164 is illustrated as a one bit field in the specific vector friendly instruction format 1200, the invention is not so limited (that is, the generic vector friendly instruction format 1100 contemplates other sizes of the data element width field 1164).

The generic vector friendly instruction format 1100 includes the following fields listed below in the order illustrated in FIG. 12A.

EVEX Prefix (Bytes 0-3) 1202—is encoded in a four-byte form.

Format Field 1140 (EVEX Byte 0, bits [7:0])—the first byte (EVEX Byte 0) is the format field 1140 and it contains 0×62 (the unique value used for distinguishing the vector friendly instruction format in one embodiment of the invention).

The second-fourth bytes (EVEX Bytes 1-3) include a number of bit fields providing specific capability.

REX field 1205 (EVEX Byte 1, bits [7-5])—consists of a EVEX.R bit field (EVEX Byte 1, bit [7]-R), EVEX.X bit field (EVEX byte 1, bit [6]-X), and 1157BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1110—this is the first part of the REX' field 1110 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1215 (EVEX byte 1, bits [3:0]-mmmm)—its content encodes an implied leading opcode byte (0F, 0F 38, or 0F 3).

Data element width field 1164 (EVEX byte 2, bit [7]-W)—is represented by the notation EVEX.W. EVEX.W is used to define the granularity (size) of the datatype (either 32-bit data elements or 64-bit data elements).

EVEX.vvvv 1220 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1220 encodes the 4 low-order bits of the first source register specifier stored in inverted (1s complement) form. Depending on the instruction, an extra different EVEX bit field is used to extend the specifier size to 32 registers.

EVEX.U 1168 Class field (EVEX byte 2, bit [2]-U)—If EVEX.U=0, it indicates class A or EVEX.U0; if EVEX.U=1, it indicates class B or EVEX.U1.

Prefix encoding field 1225 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1152 (EVEX byte 3, bit [7]-EH; also known as EVEX.EH, EVEX.rs, EVEX.RL, EVEX.write mask control, and EVEX.N; also illustrated with $\alpha$)—as previously described, this field is context specific.

Beta field 1154 (EVEX byte 3, bits [6:4]-SSS, also known as EVEX.$s_{2-0}$, EVEX.$r_{2-0}$, EVEX.rr1, EVEX.LL0, EVEX.LLB; also illustrated with $\beta\beta\beta$)—as previously described, this field is context specific.

REX' field 1110—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1170 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1230 (Byte 4) is also known as the opcode byte. Part of the opcode is specified in this field.

MOD R/M Field 1240 (Byte 5) includes MOD field 1242, Reg field 1244, and R/M field 1246. As previously described, the MOD field's 1242 content distinguishes between memory access and non-memory access operations. The role of Reg field 1244 can be summarized to two situations: encoding either the destination register operand or a source register operand, or be treated as an opcode extension and not used to encode any instruction operand. The role of R/M field 1246 may include the following: encoding the instruction operand that references a memory address, or encoding either the destination register operand or a source register operand.

Scale, Index, Base (SIB) Byte (Byte 6)—As previously described, the scale field's 1150 content is used for memory address generation. SIB.xxx 1254 and SIB.bbb 1256—the contents of these fields have been previously referred to with regard to the register indexes Xxxx and Bbbb.

Displacement field 1162A (Bytes 7-10)—when MOD field 1242 contains 10, bytes 7-10 are the displacement field 1162A, and it works the same as the legacy 32-bit displacement (disp32) and works at byte granularity.

Displacement factor field 1162B (Byte 7)—when MOD field 1242 contains 01, byte 7 is the displacement factor field 1162B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1162B is a reinterpretation of disp8; when using displacement factor field 1162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1162B substitutes the legacy x86 instruction set 8-bit displacement. Thus, the displacement factor field 1162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1172 operates as previously described.

Full Opcode Field

FIG. 12B is a block diagram illustrating the fields of the specific vector friendly instruction format 1200 that make up the full opcode field 1174 according to one embodiment of the invention. Specifically, the full opcode field 1174 includes the format field 1140, the base operation field 1142, and the data element width (W) field 1164. The base operation field 1142 includes the prefix encoding field 1225, the opcode map field 1215, and the real opcode field 1230.

Register Index Field

FIG. 12C is a block diagram illustrating the fields of the specific vector friendly instruction format 1200 that make up the register index field 1144 according to one embodiment of the invention. Specifically, the register index field 1144 includes the REX field 1205, the REX' field 1210, the MODR/M.reg field 1244, the MODR/M.r/m field 1246, the VVVV field 1220, xxx field 1254, and the bbb field 1256.

Augmentation Operation Field

FIG. 12D is a block diagram illustrating the fields of the specific vector friendly instruction format 1200 that make up the augmentation operation field 1150 according to one embodiment of the invention. When the class (U) field 1168 contains 0, it signifies EVEX.U0 (class A 1168A); when it contains 1, it signifies EVEX.U1 (class B 1168B). When U=0 and the MOD field 1242 contains 11 (signifying a no memory access operation), the alpha field 1152 (EVEX byte 3, bit [7]-EH) is interpreted as the rs field 1152A. When the rs field 1152A contains a 1 (round 1152A.1), the beta field 1154 (EVEX byte 3, bits [6:4]-SSS) is interpreted as the round control field 1154A. The round control field 1154A includes a one bit SAE field 1156 and a two bit round operation field 1158. When the rs field 1152A contains a 0 (data transform 1152A.2), the beta field 1154 (EVEX byte 3, bits [6:4]-SSS) is interpreted as a three bit data transform field 1154B. When U=0 and the MOD field 1242 contains 00, 01, or 10 (signifying a memory access operation), the alpha field 1152 (EVEX byte 3, bit [7]-EH) is interpreted as the eviction hint (EH) field 1152B and the beta field 1154 (EVEX byte 3, bits [6:4]-SSS) is interpreted as a three bit data manipulation field 1154C.

When U=1, the alpha field 1152 (EVEX byte 3, bit [7]-EH) is interpreted as the write mask control (Z) field 1152C. When U=1 and the MOD field 1242 contains 11 (signifying a no memory access operation), part of the beta field 1154 (EVEX byte 3, bit [4]-$S_0$) is interpreted as the RL field 1157A; when it contains a 1 (round 1157A.1) the rest of the beta field 1154 (EVEX byte 3, bit [6-5]-$S_{2-1}$) is interpreted as the round operation field 1159A, while when the RL field 1157A contains a 0 (VSIZE 1157.A2) the rest of the beta field 1154 (EVEX byte 3, bit [6-5]-$S_{2-1}$) is interpreted as the vector length field 1159B (EVEX byte 3, bit [6-5]-$L_{1-0}$). When U=1 and the MOD field 1242 contains 00, 01, or 10 (signifying a memory access operation), the beta field 1154 (EVEX byte 3, bits [6:4]-SSS) is interpreted as the vector length field 1159B (EVEX byte 3, bit [6-5]-$L_{1-0}$) and the broadcast field 1157B (EVEX byte 3, bit [4]-B).

FIG. 13 is a block diagram of a register architecture 1300 according to one embodiment of the invention. In the embodiment illustrated, there are 32 vector registers 1310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1200 operates on these overlaid register file as illustrated in the below tables.

| Adjustable Vector Length | Class | Operations | Registers |
|---|---|---|---|
| Instruction Templates that do not include the vector length field 1159B | A (FIG. 11A; U = 0) | 1110, 1115, 1125, 1130 | zmm registers (the vector length is 64 byte) |
| | B (FIG. 11B; U = 1) | 1112 | zmm registers (the vector length is 64 byte) |
| Instruction Templates that do include the vector length field 1159B | B (FIG. 11B; U = 1) | 1117, 1127 | zmm, ymm, or xmm registers (the vector length is 64 byte, 32 byte, or 16 byte) depending on the vector length field 1159B |

In other words, the vector length field 1159B selects between a maximum length and one or more other shorter lengths, where each such shorter length is half the length of the preceding length; and instructions templates without the vector length field 1159B operate on the maximum vector length. Further, in one embodiment, the class B instruction templates of the specific vector friendly instruction format 1200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1315—in the embodiment illustrated, there are 8 write mask registers (k0 through k7), each 64 bits in size. In an alternate embodiment, the write mask registers 1315 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
a non-transitory machine-readable medium including instructions, which when read by the machine-readable medium, causes the processor to:
execute one or more gather setup operations in anticipation of one or more gather operations, the gather setup operations to compute a gather state to be used by subsequent gather operations, wherein the computation of the gather state by the gather setup operations is to include to determine one or more addresses of vector data elements to be gathered by the gather operations, and wherein the gather state comprises a non-architectural processor state stored within one or more internal processor storage locations; and
execute the one or more gather operations to gather vector data elements using the gather state computed by the gather setup operations.

2. The processor as in claim 1 wherein the gather setup operations comprise gather setup instructions and wherein the gather operations comprise gather instructions.

3. The processor as in claim 2 further comprising:
a decoder to decode the gather setup instructions and gather instructions; and
an execution unit to execute the gather setup instructions and gather instructions, wherein the gather setup instructions calculate addresses of the vector data elements to be gathered when executed by the execution unit and wherein the addresses are provided to the decoder for use by the gather instructions during decoding.

4. The processor as in claim 2 further comprising:
an instruction fetch unit to fetch the gather setup instructions and the gather instructions from a memory.

5. The processor as in claim 1 further comprising:
an index register to store an index value for each of the vector data elements to be gathered; and
a base address register to store a base address for the vector data elements,
wherein the addresses of the vector data elements to be gathered is to be determined by adding the index value for each vector data element to the base address.

6. The processor as in claim 5 further comprising:
a mask register to store a mask bit associated with each of the vector data elements, wherein a first mask bit value indicates that the vector data element associated therewith will be gathered and a second mask bit value indicates that the vector data element associated therewith will not be gathered.

7. The processor as in claim 6 wherein the gather setup operations or the gather operations reset each mask bit from the first mask bit value to the second mask bit value upon generating an address for the vector data element associated with each respective mask bit.

8. The processor as in claim 1 wherein a prior gather operation determines an address of a vector data element to be gathered by a subsequent gather operation, the processor is to execute the subsequent gather operation using the address determined by the prior gather operation.

9. The processor as in claim 1 wherein first and second gather setup operations are executed prior to executing a first gather operation.

10. The processor as in claim 9 wherein the first gather operation uses an address determined by the first gather setup operation and a second gather operation uses an address determined by the second gather setup operation.

11. The processor as in claim 1 wherein the gather state comprises a non-architectural processor state stored within one or more internal processor storage locations.

12. A method comprising:
executing one or more gather setup operations in anticipation of one or more gather operations, the gather setup operations to compute a gather state to be used by subsequent gather operations, wherein the computation of the gather state by the gather setup operations is to include to determine one or more addresses of vector data elements to be gathered by the gather operations, and wherein the gather state comprises a non-architectural processor state stored within one or more internal processor storage locations; and
executing the one or more gather operations to gather vector data elements using the gather state computed by the gather setup operations.

13. The method as in claim 12 wherein the gather setup operations comprise gather setup instructions and wherein the gather operations comprise gather instructions.

14. The method as in claim 13 further comprising:
decoding the gather setup instructions and gather instructions; and
executing the gather setup instructions and gather instructions,
wherein the gather setup instructions calculate addresses of the vector data elements to be gathered when executed and wherein the addresses are provided for use by the gather instructions during decoding.

15. A system comprising:
a memory for storing instructions and data;
a cache having a plurality of cache levels for caching the instructions and data; and
a non-transitory machine-readable medium including instructions, which when read by the machine-readable medium, causes a processor to:
execute one or more gather setup operations in anticipation of one or more gather operations, the gather setup operations to determine one or more addresses of vector data elements to be gathered by the gather operations, wherein the gather setup operations is further to compute a gather state comprises a non-architectural processor state stored within one or more internal processor storage locations; and
execute the one or more gather operations to gather vector data elements using the one or more addresses determined by the gather setup operations.

16. The system as in claim 15 wherein the gather setup operations comprise gather setup instructions and wherein the gather operations comprise gather instructions.

17. The system as in claim 16 further comprising:
a decoder to decode the gather setup instructions and gather instructions; and
the processor further to execute the gather setup instructions and gather instructions, wherein the gather setup instructions calculate the addresses of data elements to be gathered when executed by the execution unit and wherein the addresses are provided to the decoder for use by the gather instructions during decoding.

18. A processor comprising:
a non-transitory machine-readable medium including instructions, which when read by the machine-readable medium, causes the processor to:
execute one or more gather setup operations in anticipation of one or more gather operations, the gather setup operations to compute a gather state to be used by subsequent gather operations, wherein the computation of the gather state by the gather setup operations is to include to determine one or more addresses of vector data elements to be gathered by the gather operations, and wherein the gather state comprises a non-architectural processor state stored within one or more internal processor storage locations; and
execute the one or more gather operations to gather vector data elements using the gather state computed by the gather setup operations,
wherein the gather state allows the gather setup operations and gather operations to be performed without stalling.

19. The processor as in claim 18 wherein the processor is further to:
compare the gather state with a gather operation and determine whether a match exists between the gather state and the gather operation;
wherein if a match exists, then the gather operation is to execute more efficiently by using the gather state computed by the gather setup operation; and
wherein if a match does not exist then the gather operation is to execute less efficiently without using the gather state computed by the gather setup operation.

20. The processor as in claim 19 wherein the gather state computed by the gather setup operation comprises a non-architectural processor state.

21. The processor as in claim 19 wherein a match is determined by comparing one or more characteristics of the gather state with one of more characteristics associated with the gather operation.

22. The processor as in claim 21 wherein the characteristics comprise register operands and type conversion of the gather state and gather operations.

23. A processor comprising:
a non-transitory machine-readable medium including instructions, which when read by the machine-readable medium, causes the processor to:
execute one or more gather setup operations in anticipation of one or more gather operations, the gather setup operations to compute a gather state, wherein the computation of the gather state by the gather setup operations is to include to determine one or more addresses of vector data elements to be gathered by the gather operations, and wherein each address determined is to through a single gather setup instruction;

execute the one or more gather operations to gather vector data elements; and compare the gather state with a gather operation and determine whether a match exists between the gather state and the gather operation;

wherein if a match exists, then the gather operation is to execute more efficiently by using the gather state computed by the gather setup operation; and wherein if a match does not exist then the gather operation is to execute less efficiently without using the gather state computed by the gather setup operation.

24. The processor as in claim 23 wherein the gather state computed by the gather setup operation comprises a non-architectural processor state.

25. The processor as in claim 23 wherein a match is determined by comparing one or more characteristics of the gather state with one of more characteristics associated with the gather operation.

26. The processor as in claim 25 wherein the characteristics comprise register operands and type conversion of the gather state and gather operations.

* * * * *